United States Patent
Oshima et al.

(10) Patent No.: US 6,264,782 B1
(45) Date of Patent: *Jul. 24, 2001

(54) PRINT WITH HOLOGRAM AND PROCESS FOR PRODUCING THE SAME

(75) Inventors: Katsuyuki Oshima; Mikiko Kudo; Jiro Onishi, all of Tokyo-To (JP)

(73) Assignee: Dai Nippon Printing Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/649,003

(22) Filed: May 16, 1996

(30) Foreign Application Priority Data

May 18, 1995 (JP) ................................................. 7-142414

(51) Int. Cl.⁷ ............................. B41M 5/40; B41M 5/035
(52) U.S. Cl. ................... 156/237; 156/235; 156/239; 283/77; 283/86; 430/1; 430/2; 503/227; 359/3
(58) Field of Search ..................................... 156/235, 237, 156/239, 240; 283/72, 86; 359/1, 3; 430/1, 2; 503/227

(56) References Cited

U.S. PATENT DOCUMENTS

| | | | |
|---|---|---|---|
| 4,856,857 | * | 8/1989 | Takeuchi et al. .................. 283/86 |
| 5,217,773 | * | 6/1993 | Yoshida .............................. 428/40 |
| 5,254,525 | * | 10/1993 | Nakajima et al. ................. 503/227 |
| 5,267,755 | * | 12/1993 | Yamauchi et al. ................. 283/86 |
| 5,275,912 | * | 1/1994 | Riley ................................. 430/201 |
| 5,296,442 | * | 3/1994 | Fujimura et al. .................. 503/227 |
| 5,300,169 | * | 4/1994 | Tahara ................................ 430/2 |
| 5,344,808 | * | 9/1994 | Watanabe et al. .................... 430/2 |

FOREIGN PATENT DOCUMENTS 0 407 615 A1   1/1991  (EP).
1-283192    * 11/1989  (JP) ............................... 283/86

* cited by examiner

Primary Examiner—Martin Angebranndt
(74) Attorney, Agent, or Firm—Parkhurst & Wendel, L.L.P.

(57) ABSTRACT

A print with a hologram, such as an ID card, including a transferred image including a transferred sublimable dye image of a full color using sublimable dye inks, and a hologram and the like laminated on the transferred image for security purposes. Even when stored or used for a long period of time, the hologram causes no unfavorable phenomena, such as bleeding, in the sublimation dye thermal transferred image and has excellent durability. A process for producing such a print with a hologram is also disclosed. In the production of the print with a hologram, a transferred image 2 of a sublimable dye ink or a combination of a transferred image 2 of a sublimable dye ink with a transferred image 3 of a hot-melt ink is provided on an image-receiving sheet 1. A protective layer 4 is provided by thermal transfer or other means on the transferred image so as to cover the transferred image, and, thereafter, a hologram layer 5 is thermally transferred from a thermal transfer sheet onto the protective layer 4, or a laminate including a hologram layer, for example, a heat-bondable hologram label (seal), is heated and pressed by a hot plate or a hot roll to heat-bond the laminate to the protective layer.

11 Claims, 1 Drawing Sheet

PRINT WITH HOLOGRAM AND PROCESS FOR PRODUCING THE SAME

TECHNICAL FIELD

The present invention relates to a print with a hologram, wherein a hologram is laminated onto a print, with an image formed by thermal transfer of a sublimable dye ink or a combination of a sublimable dye ink with a hot-melt ink, in order to prevent fabrication or alteration of print, and a process for producing the same. More particularly, the present invention relates to a print with a hologram, wherein a hologram is laminated in a durable form on a print containing a photograph-like image, such as an identification (ID) card or a passport, to satisfactorily prevent fabrication or alteration of the print and to improve the long-term storage stability, and a process for producing the same.

BACKGROUND OF THE INVENTION

Various thermal transfer recording systems are known in the art, and one of them is a recording system in which, using a thermal transfer film comprising a substrate film bearing a hot-melt ink layer containing a colorant, such as a pigment, and a vehicle, such as wax, or a sublimzable dye ink layer formed of a sublimable dye, a resin and the like, a colorant is transferred onto an image-receiving sheet or the like by heating means, such as a thermal head or a laser beam, to form an image.

In particular, a sublimation dye thermal transfer recording system using a thermal transfer film having a sublimable dye ink layer can express density gradation, creates a very sharp image, has excellent halftone color reproduction and gradation reproduction, and can form an image having a quality comparable to that formed by silver salt photography and, hence, is rapidly expanding its market to various applications.

These thermal transfer recording systems enable various images to be simply formed and, hence, have become utilized in prints wherein the number thereof may be relatively small, for example, in the preparation of identification (ID) cards and the like.

In the field of ID cards and the like, the security is particularly important. For this reason, the provision of a hologram image on an ID image formed using the thermal transfer film as described above has been proposed for the purpose of preventing alteration of ID cards and the like (Japanese Patent Laid-Open No. 159794/1991).

In an ID card or the like, however, the transfer of a hologram layer directly onto a transferred image of a sublimable dye ink by means of a thermal head or a hot stamper or the lamination of a hot-bondable laminate sheet including a hologram layer, that is, a hot-bondable hologram label (seal), onto the transferred image by applying heat and pressure using a hot plate or a hot roll does not pose any problem for some time. However, the resultant print with a hologram unfavorably causes bleeding in an image formed by sublimation dye transfer during use of the print for a long period of time, making it impossible to continue use of the print.

The cause of this unfavorable phenomenon has been considered attributable to the presence of a material, which is likely to cause bleeding of a sublimable dye, such as a resin having a low glass transition point or a plasticizer, incorporated, for the purpose of facilitating the transfer or heat bonding, into an adhesive layer in the hologram layer or the laminate including a hologram layer to be transferred or heat-bonded on the transferred image of a sublimable dye.

In view of the above, the present invention has been made, and an object of the present invention is to provide a print with a hologram, suitable as a print required to have a security property, such as ID cards, which is excellent in sharpness of a full-color image formed by the thermal transfer system, possesses excellent halftone color reproduction and gradation reproduction, has an optical diffraction structure, for preventing fabrication and alteration of the print, laminated onto the print to impart a security property to the print, and is free from the occurrence of bleeding or the like in the transferred image even after storage for a long period of time and excellent also in durability, and a process for producing the same.

DISCLOSURE OF INVENTION

The above object can be attained by the following present invention.

Specifically, the invention relates to a print with a hologram, comprising an image-receiving sheet, a transferred image of a sublimable dye ink or a combination of a transferred image of a sublimable dye ink with a transferred image of a hot-melt ink and a protective layer provided in that order on the image- receiving sheet, and a hologram layer laminated onto the protective layer.

The invention also relates to a print with a hologram, wherein the hologram layer is a laminate including a hologram layer, for example, a hot-bondable hologram label (seal).

In the above print with a hologram, the protective layer, particularly an adhesive layer in the protective layer, which is in contact with the surface of the transferred image of a sublimable dye ink is formed of a material not containing a plasticizer, a resin having a low glass transition point or the like.

The invention also relates to a process for producing a print with a hologram, comprising the steps of providing a transferred image of a sublimable dye ink or a combination of a transferred image of a sublimable dye ink with a transferred image of a hot-melt ink on an image-receiving sheet, providing a protective layer on the transferred image, and using a thermal head, a hot stamper (a hot plate), or a hot roll to transfer a hologram layer from a thermal transfer sheet for a hologram and to laminate the hologram layer onto the protective layer The invention also relates to a process for producing a print with a hologram, comprising the steps of: providing a transferred image of a sublimable dye ink or a combination of a transferred image of a sublimable dye ink with a transferred image of a hot-melt ink on an image-receiving sheet, providing a protective layer on the transferred image, and laminating a laminate including a hologram layer, for example, a hot-bondable hologram label (seal), onto the protective layer by applying heat and pressure using a hot plate or a hot roll.

The construction of the print with a hologram according to the present invention is such that a transferred image of a sublimable dye ink or a combination of a transferred image of a sublimable dye ink with a transferred image of a hot-melt ink and a protective layer are provided in that order on an image-receiving sheet, and a hologram layer or a laminate including a hologram layer, that is, a hologram label (seal) is heat-bonded onto the protective layer.

By virtue of the above construction, the hologram layer or the laminate including a hologram layer imparts a security property to the print, and, since the protective layer (including the adhesive layer) provided on the transferred image of a sublimable dye ink is formed of a material not containing any substance, that causes bleeding of the sublimable dye, such as a plasticizer or a resin having a low glass transition point, the print, even when used or stored for a long period of time, does not cause bleeding, of the sublimation transferred image, attributable to elution or migration of the dye and has improved durability.

BEST MODE FOR CARRYING OUT THE INVENTION

The present invention will be described in detail with reference to the accompanying drawings.

Figure 1:
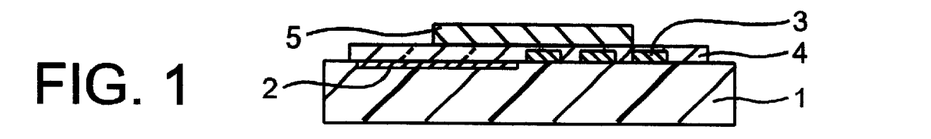
FIG. 1 is a typical cross-sectional view showing the construction of one embodiment of a print with a hologram according to the present invention.
Figure 2:
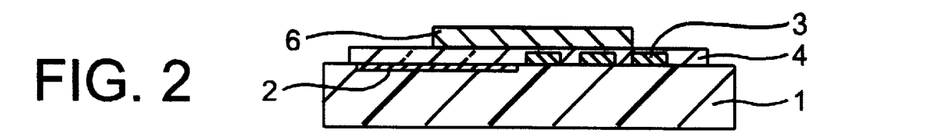
FIG. 2 is a typical cross-sectional view showing the construction of another embodiment of a print with a hologram according to the present invention.

FIGS. 1 and 2 are typical cross-sectional views of embodiments of the print with a hologram according to the present invention.

In FIG. 1, an image-receiving sheet 1 serves as an object onto which an image is formed using a thermal transfer film. It generally comprises a substrate sheet, a dye-receptive layer provided on one surface of the substrate sheet, and, optionally, a back surface layer provided on the surface (back surface) of the substrate sheet remote from the dye-receptive layer, for the purpose of regulating the slipperiness of the image-receiving sheet 1 and preventing contamination attributable to the migration of a sublimable dye into the back surface of the sheet during storage of prints in a stacked state.

For example, plastic films or sheets of polyesters, polyvinyl chloride, vinyl chloride/vinyl acetate copolymer, polycarbonate and the like may be used as the substrate sheet. In particular, in the case of a vinyl chloride/vinyl acetate copolymer sheet, the resin per se has good dyeability with a sublimable dye, enabling the dye-receptive layer to be omitted. On the other hand, if the plastic film or sheet, when used alone, has no satisfactory dyeability with the sublimable dye, a dye-receptive layer may be provided. Alternatively, a plasticizer or the like may be added to the resin to regulate the dyeability or the like.

Besides the above plastic films and sheets, paper and woven fabrics or nonwoven fabrics of synthetic fibers, such as polyester, polyamide, polypropylene, and vinylon fibers, may also be used as the substrate sheet. Further, it is also possible to use these sheets with a dye-receptive layer provided thereon.

When the dye-receptive layer is provided, conventional resins commonly used in a receptive layer for sublimation dye thermal transfer recording may be used as a material for the dye-receptive layer. Among others, vinyl, polycarbonate, polyester, and polyvinylacetal resins are particularly preferred because they can receive a sublimable dye and maintain the formed image.

Further, when the print according to the present invention is used in applications of cards, the image-receiving sheet may previously have an emboss, a writable layer for signature, an IC memory, a magnetic layer, a print, and the like. Alternatively, an emboss, a writable layer for signature, an IC memory, a magnetic layer, and the like may be provided after transfer of the protective layer.

Thereafter, a transferred image 2 of a sublimable dye ink or a combination of a transferred image 2 of a sublimable dye ink with a transferred image 3 of a hot-melt ink is provided on the image-receiving sheet 1, and, a protective layer 4 is provided on the transferred image 2 or the transferred images 2, 3 by the transfer of a hot-melt transparent ink. The transfer of the image and the transfer of the protective layer may be carried out using respective thermal transfer sheets by means of a thermal transfer printer using a thermal head or the like.

A hologram layer 5, which imparts a security property to the print, is laminated, onto the protective layer 4, using a thermal transfer sheet for a hologram (see FIG. 5) by means of any one of a thermal head, a hot stamper, and a hot roll.

The construction of the print with a hologram shown in FIG. 2 is such that a transferred image 2 or transferred images 2, 3 and a protective layer 4 on the transferred image are formed, on an image-receiving sheet 1, using the same materials as in the construction shown in FIG. 1 in the same manner as in the construction shown in FIG. 1 and a hologram layer 5 is laminated onto the protective layer 4 by a method different from the method used in the construction shown in FIG. 1 (i.e., lamination of the hologram by the transfer thereof from a thermal transfer sheet for a hologram), that is, by a method wherein a laminate 6 including a hologram layer (see FIG. 6), that is, a hot-bondable hologram label (seal), is heated and pressed against the protective layer 4 by means of a hot plate or a hot roll to laminate the laminate onto the protective layer 4.

In FIGS. 1 and 2, the transfer image 2 of a sublimable dye ink, the transferred image 3 of a hot-melt ink, and the protective layer 4 of a hot-melt transparent ink may be formed using respective thermal transfer sheets which have been separately prepared. In this case, after the completion of one transfer step, the transfer sheet is replaced with a transfer sheet for the next transfer step. Alternatively, the transferred images 2, 3 and the protective layer 4 may be formed in one transfer step. In this case, for example, a thermal transfer sheet, wherein a sublimable dye ink layer, a hot-melt ink layer, and a hot-melt transparent ink layer are provided on an identical substrate film in a face serial manner, and the images and the protective layer are transferred using this transfer sheet in one step by means of a thermal transfer printer using a thermal head.

In this connection, it should be noted that, when a thermal transfer sheet for a protective layer is separately prepared, the transfer of the protective layer may be performed by means of a hot stamper or a hot roll besides the thermal transfer printer using a thermal head or the like.

Figure 3:
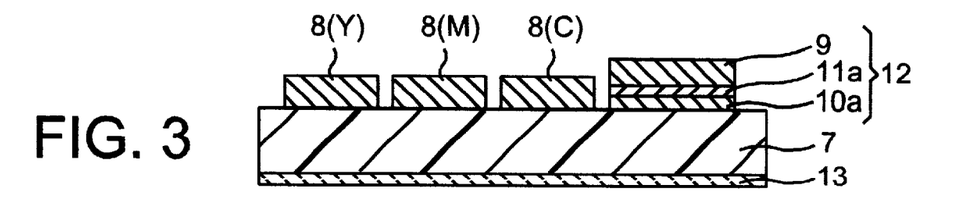
FIG. 3 is a typical cross-sectional view of the construction of one embodiment of a thermal transfer sheet used for the formation of a transferred image.

FIG. 3 is a typical cross-sectional view showing the construction of one embodiment of a thermal transfer sheet used for the formation of a transferred image.

Figure 4:
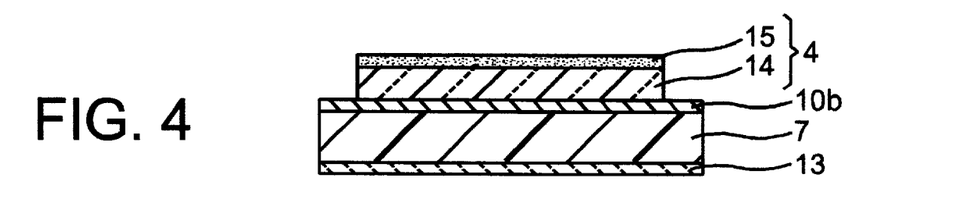
FIG. 4 is a typical cross-sectional view of the construction of one embodiment of a thermal transfer sheet used for the transfer of a protective layer to be provided on a transferred image.

FIG. 4 is a typical cross-sectional view showing the construction of one embodiment of a thermal transfer sheet used for the transfer of a protective layer provided on the transferred image.

In the thermal transfer sheet shown in FIG. 3, a sublimable dye ink layer (three colors of yellow, magenta, and cyan) and a hot-melt ink layer (for example, black) are successively arranged in a face serial manner on an identical substrate film.

Specifically, a sublimable dye ink layer comprising a substrate film 7 and, provided on one surface thereof, a sublimable dye ink layer formed of a sublimable dye held by a binder is provided in the order of, for example, a sublimable yellow ink layer 8 (Y), a sublimable magenta ink layer 8 (M), and a sublimable cyan ink layer 8 (C) in a face serial manner, and a hot-melt ink layer region 12 is then provided adjacent to the sublimable cyan ink layer 8 (C). In the thermal transfer sheet having the above construction, for example, a photograph-like color image of a face is formed using sublimable dye inks of yellow, magenta, and cyan, and high-density and clear letters or marks are printed using a hot-melt ink, for example, a hot-melt black ink. Preferably, the hot-melt ink layer region 12 is generally constructed in such a manner that, as shown in FIG. 3, a release layer 10a, a release protective layer 11a, and a hot-melt ink layer 9 are laminated in that order on the substrate film 7.

Further, in the construction shown in FIG. 3, a heat-resistant slip layer 13 is provided on the surface (back surface) of the substrate film 7 remote from the thermal transfer ink layer in order to impart heat resistance/slipperiness and releasability, thereby preventing the substrate film from fusing to a thermal head, improving the carriability of the thermal transfer film, and avoiding the adhesion of the back surface to the thermal transfer ink layer at the time of taking up the thermal transfer film in a roll form. The heat-resistant slip layer 13 is not essential and may be optionally provided.

All of known materials commonly used in the conventional sublimation dye transfer sheets or hot-melt ink transfer sheets may be used as materials for constituting the layers in the thermal transfer sheet.

For example, plastic films, such as polyester films including polyethylene terephthalate films, polystyrene films, polypropylene films, polysulfone films, polyphenylene sulfide films, polycarbonate films, and cellulosic resin films; and paper and various types of converted paper may be used as the substrate film 7.

Among them, polyester films are preferred, and a polyethylene terephthalate film is more preferred. The thickness of the substrate film is in the range of from about 2 to 50 μm, preferably about 3 to 10 μm. Further, if necessary, a primer layer (not shown) may be preferably provided on one or both surfaces of the substrate film 7 from the viewpoint of improving the adhesion of the substrate film to the thermal transfer ink layer and the heat-resistant slip layer.

The above substrate film 7 may be used not only as the substrate film for the above thermal transfer ink sheet but also as the substrate film for a thermal transfer sheet used in the transfer of a protective layer onto a transferred image of an image-receiving sheet shown in FIG. 4, as a substrate film for a hologram transfer sheet described below, and as a transparent film laminated on the outermost layer of a laminate including a hologram layer.

In FIG. 3, the heat-resistant slip layer 13 provided on the surface of the substrate film 7 remote from the thermal transfer ink layer may be formed of a material having good releasability and heat resistance, for example, a curable silicone oil, a curable silicone wax, a silicone resin, a fluororesin, or an acrylic resin. The heat-resistant slip layer may also be formed of a material prepared by reacting a thermoplastic resin having —OH or —COOH group with a compound having two or more amino groups or a diisocyanate or a triisocyanate to cure the resin through crosslinking.

The slip property can be further improved by incorporating a phosphoric ester surfactant or a filler having cleavability, such as talc or mica, into the heat-resistant slip layer.

All the dyes which are melted, diffused, or transferred by sublimation upon heating and used in the conventional thermal transfer film may be effectively used as dyes for the sublimable dye ink layer in the present invention, that is, a sublimable yellow ink layer 8 (Y), a sublimable magenta ink layer 8 (M), and a sublimable cyan ink layer 8 (C). However, the dyes used are preferably selected by taking into consideration hue, light fastness, and solubility in the binder. Examples of such dyes include diarylmethane dyes; triarylmethane dyes; thiazole dyes; methine dyes, such as merocyanine; azomethine dyes, exemplified by indoaniline, acetophenone azomethine, pyrazolone azomethine, imidazole azomethine, imidazo azomethine, and pyridine azomethine; xanthene dyes; oxazine dyes; cyanomethylene dyes exemplified by dicyanostyrene and tricyanostyrene; thiazine dyes; azine dyes; acridine dyes; benzene azo dyes; azo dyes exemplified by pyridine azo, thiophene azo, isothiazole azo, pyrrole azo, pyrazole azo, imidazole azo, thiadiazole azo, triazole azo, and disazo dyes; spiropyran dyes; indolinospiropyran dyes; fluoran dyes; rhodamine lactam dyes; naphthoquinone dyes; anthraquinone dyes; and quinophthalone dyes.

Specific examples of dyes are as follows:

C.I. (color index) Disperse Yellow 51, 3, 54, 79, 60, 23, 7, and 141;

C.I. Disperse Blue 24, 56, 14, 301, 334, 165, 19, 72, 87, 287, 154, 26, and 354;

C.I. Disperse Red 135, 146, 59, 1, 73, 60, and 167;

C.I. Disperse Orange 149;

C.I. Disperse Violet 4, 13, 26, 36, 56, and 31;

C.I. Solvent Yellow 56, 14, 16, 29, and 201;

C.I. Solvent Blue 70, 35, 63, 36, 50, 49, 111, 105, 97, and 11;

C.I. Solvent Red 135, 81, 18, 25, 19, 23, 24, 143, 146, and 182;

C.I. Solvent Violet 13;

C.I. Solvent Black 3; and

C.I. Solvent Green 3.

For example, dyes usable in the present invention are cyan dyes including Kayaset Blue 714 (Solvent Blue 63, manufactured by Nippon Kayaku Co., Ltd.), Foron Brilliant Blue S-R (Disperse Blue 354, manufactured by Sandoz K.K.), and Waxoline AP-FW (Solvent Blue 36, manufactured by ICI Japan); magenta dyes including MS-RED G (Disperse Red 60, manufactured by Mitsui Toatsu Chemicals, Inc.) and Macrolex Violet R (Disperse Violet 26, manufactured by Bayer), and yellow dyes including Foron Brilliant Yellow S-6GL (Disperse Yellow 231, manufactured by Sandoz K.K.) and Macrolex Yellow 6G (Disperse Yellow 201, manufactured by Bayer).

The binder resin for holding the above dye may be any conventional one, and examples of such a binder resin include cellulosic resins, such as ethyl cellulose, ethylhydroxy cellulose, hydroxypropyl cellulose, methyl cellulose, and cellulose acetate, vinyl resins, such as polyvinyl alcohol, polyvinyl acetate, polyvinyl butyral, polyvinyl acetal, and polyvinyl pyrrolidone, acrylic resins, such as poly(meth) acrylate and poly(meth)acrylamide, polyurethane resins, polyamide resins, and polyester resins. These resins may be used alone or as a mixture of two or more. Among the above resins, polyvinyl butyral and polyvinyl acetal are preferred from the viewpoint of dye transfer and storage stability of the thermal transfer film.

Further, in the present invention, the following releasable graft copolymer may be used as a binder or as a release agent added to the binder. Alternatively, the releasable graft copolymer may be used in a layer, containing a releasable resin, optionally provided on the outermost layer of the sublimable dye ink layer. The releasable graft copolymer may be prepared by graft-polymerizing at least one releasable segment selected from a polysiloxane segment, a fluorocarbon segment, a fluorohydrocarbon segment, and a long-chain alkyl segment onto a main chain of a polymer.

The graft copolymer prepared by grafting a polysiloxane segment onto a main chain of polyvinyl acetal resin is particularly preferred.

The above graft copolymer may be prepared, for example, by reacting a polysiloxane having a functional group with a diisocyanate to prepare a silicone chain for grafting and grafting the silicone chain onto polyvinyl acetal. More specifically, for example, a silicone-grafted polyvinyl acetal resin may be prepared by reacting hexamethylene diisocyanate with a dimethylpolysiloxane having at its one end a hydroxyl group in a solvent of a 1:1 mixture of methyl ethyl ketone and methyl isobutyl ketone in the presence of a tin-base catalyst (for example, dibutyltin) at a reaction temperature of about 0.01 to 100° C. to prepare a silicone chain for grafting and then reacting the silicone chain with polyvinyl acetal resin in a solvent of a 1:1 mixture of methyl ethyl ketone and methyl isobutyl ketone.

When the graft copolymer is used as a release agent for the sublimable dye ink layer, the content of the releasable segment in the release agent is preferably such that the content of the releasable segment in the graft copolymer is in the range of from 10 to 80% by weight. When the content of the releasable segment is excessively low, the releasability is unsatisfactory, while when it is excessively high, the miscibility with the binder is lowered, causing a problem associated with dye transfer or the like.

When the above release agents are added to the sublimable dye ink layer, they may be used alone or as a mixture of two or more. The amount of the release agent added is preferably 1 to 40 parts by weight based on 100 parts by weight of the binder resin. When the amount of the release agent added is excessively small, the release effect is unsatisfactory, while when it is excessively large, deterioration in the transfer of the dye from the sublimable dye ink layer or the coating strength and problems of discoloration of the dye contained in the sublimable dye ink layer and storage stability of the thermal transfer film unfavorably occur.

The sublimable dye ink layer, i.e., a sublimable yellow ink layer 8 (Y), a sublimable magenta ink layer 8 (M), and a sublimable cyan ink layer 8 (C), may be preferably formed by coating the above substrate film with a solution of the above dye and binder resin and optionally various additives dissolved in a suitable solvent or a dispersion of the above components in a suitable organic solvent or water by gravure printing, screen printing, or reverse roll coating using a gravure plate in the case of a single color and then drying the resultant coating to form respective sublimable dye ink layers.

In this case, each sublimable dye ink layer may be provided by single coating. Alternatively, it may be provided by double coating. The double coating can enhance the dye coverage per unit area, Further, the provision of a layer (not shown) containing the above releasable resin as the outermost layer of the sublimable dye ink layer can prevent heat fusing of the sublimable dye ink layer even when printing is carried out on an image-receiving object lean in a releasable component, such as a plastic card.

The thickness of the sublimable dye ink layer thus formed is suitably about 0.2 to 5.0 $\mu$m, preferably about 0.4 to 2.0 $\mu$m.

In FIG. 3, the release layer 10a as the innermost layer in the hot-melt ink layer region 12 provided adjacent to the sublimable cyan ink layer 8 (C) may be formed of a wax used as a vehicle in the hot-melt ink layer 9 described below, or a releasable resin, such as silicone resin, fluororesin, acrylic resin, cellulosic resin, vinyl chloride/vinyl acetate copolymer resin, polyvinyl alcohol, or urethane resin. They may be used alone or as a mixture of two or more.

The release layer 10a may be formed in the same manner as described above in connection with the sublimable dye ink layer, that is, by gravure printing, screen printing or other means, and a thickness of about 0.1 to 5 $\mu$m suffices for the release layer 10a.

The release protective layer 11a provided on the release layer 10a may be formed of preferably a resin having excellent transparency, abrasion resistance, chemical resistance, and other properties, such as acrylic resin, polyester resin, or urethane resin.

It may be formed by preparing a solution of a suitable resin in the same manner as described above in connection with the formation of the sublimable dye ink layer and coating the solution in a thickness of about 0.2 to 10 $\mu$m by the above printing method. In the formation of the release protective layer 11a, it is also possible to add a filler, such as silica or alumina, for the purpose of improving the releasability at the time of transfer. In addition, when the abrasion resistance and the slip property should be improved, a wax, such as polyethylene wax, may be incorporated into the release protective layer 11a.

It should be noted that the provision of the release layer 10a may be omitted when the releasability of the release protective layer 11a from the substrate film 7 is satisfactory.

The hot-melt ink layer 9 provided on the release protective layer 11a comprises a colorant and a vehicle and optionally suitable additives. The colorant is preferably an organic or an inorganic pigment or dye which has good properties as a recording material, for example, a satisfactory color density and resistance to light, heat, temperature and the like sufficient to prevent fading. Although yellow, magenta, cyan, and the like may be used as the colorant, a black colorant which can provide a print of sharp letters and symbols with high density is preferred from the viewpoint of the object of the present invention.

The vehicle is composed mainly of a wax which is used as a mixture with a drying oil, a resin, a mineral oil, cellulose, or a rubber derivative.

Waxes usable as the vehicle include microcrystalline wax, carnauba wax, and paraffine wax. It is also possible to use other various waxes such as Fischer-Tropsh wax, various low-molecular weight polyethylene, Japan wax, beeswax, spermaceti, insect wax, wool wax, shellac wax, candelilla wax, petrolatum, partially modified wax, fatty acid esters, and fatty acid amides.

In the present invention, however, a resin mixture of a vinyl chloride/vinyl acetate copolymer resin or an acrylic resin with at least one of a chlorinated rubber, a vinyl chloride/vinyl acetate copolymer resin, and a cellulosic resin is still preferably used as a vehicle for the black ink layer or the like from the viewpoint of the adhesion to a card and scratch resistance.

The hot-melt ink layer 9 may be formed on the release protective layer 11a provided on the substrate film 7 by coating in a pattern form according to, for example, a hot-melt coating method using a gravure plate or other conventional coating methods such as hot lacquer coating, or gravure coating. In the case of full solid coating, in addition to the above coating methods, gravure reverse coating, roll coating and the like may be used. The thickness of the hot-melt ink layer should be determined by taking into consideration the balance of necessary density and heat sensitivity. In general, it is preferably in the range of from 0.2 to 10 µm.

FIG. 4 shows the construction of a thermal transfer sheet which has been separately prepared for the provision of a protective layer 4 on the transferred image. This thermal transfer sheet comprises a substrate film 7, a release layer 10b provided on one surface of the substrate film 7, a protective layer 4, comprising a release transparent resin layer 14 and an adhesive layer 15 laminated in that order, provided on the release layer 10b; Optionally, a heat-resistant slip layer 13 is provided on the other surface of the substrate 7. This construction can further improve the transferability of the protective layer.

In FIG. 4, the release layer 10b may be formed by coating a coating liquid composed mainly of a wax described above as the vehicle for the hot-melt ink layer, or silicone wax, a silicone resin, a fluororesin, an acrylic resin, polyvinyl alcohol or the like by any conventional method, such as gravure coating or gravure reverse coating, and drying the resultant coating. A thickness of about 0.1 to 2 µm suffices for the release layer 10b.

When the protective layer is desired to be matte in a print after transfer, it is possible to incorporate various particles into the release layer 10b or to use, in the case of a thin release layer, a substrate film 7 with the surface thereof on the side of the release layer being matte-finished. When such a transfer sheet for a protective layer is used, the surface of the print onto which the protective layer 4 has been transferred becomes matte.

The provision of the release layer 10b may be omitted when the releasability of the release transparent resin layer 14 of the protective layer 4 from the substrate film 7 is satisfactory.

The release transparent resin layer 14 constituting the protective layer 4 may be formed of a polyester resin, an acrylic resin, a urethane resin, an acrylic urethane resin, a vinyl chloride/vinyl acetate copolymer resin, or a mixture of the above resins. Further, it is also possible to use an ionizing radiation-cured resin because of its excellent plasticizer resistance.

Further, the addition of a wax, a lubricant, an antioxidant and/or a fluorescent brightening agent as additives can improve the slip property, gloss, light fastness, weather resistance, whiteness, and other properties of various images to be covered with the protective layer. As with the above release layer 10b, the release transparent resin layer 14 may be provided by the known coating method. The thickness of the release transparent resin layer 14 may be in the range of from about 0.5 to 5 µm. When improving the light fastness of the print is particularly desired, it is also possible to separately provide an ultraviolet-screening layer.

The adhesive layer 15 which serves to effectively transfer the protective layer 4 may be formed of a resin having good heat bondability, for example, an acrylic resin, a urethane resin, a vinyl chloride resin, a vinyl acetate resin, a polyester resin, or a polyamide resin. In the present invention, preferably, in order to prevent bleeding in the transferred image, no plasticizer is used as the additive and the like, and also regarding the resin, the resin having a low glass transition point is not used or the amount of such a resin used is minimized.

As with the release transparent resin layer 14, the adhesive layer 15 in the protective layer 4 may be provided by coating a solution of the resin as described above according to the conventional method, such as gravure coating, gravure reverse coating, or roll coating, and drying the coating. The thickness of the adhesive layer 15 is suitably in the range of from about 0.1 to 5 µm.

The hologram layer will be described with reference to FIGS. 5 and 6.

Figure 5:
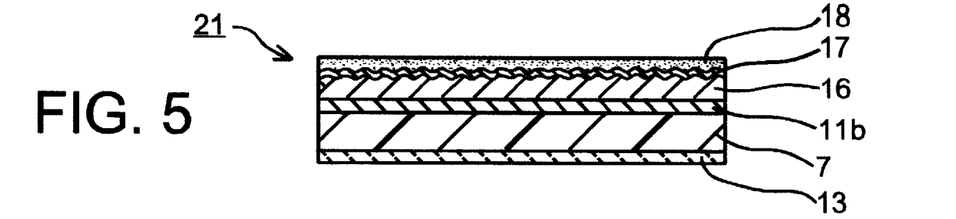
FIG. 5 is a typical cross-sectional view of the construction of one embodiment of a hologram transfer sheet used for the transfer of a hologram layer to be laminated on a protective layer.

FIG. 5 is a typical cross-sectional view showing one embodiment of a thermal transfer sheet 21 for the transfer of a hologram layer. The thermal transfer sheet 21 comprises a substrate film 7, a heat-resistant slip layer 13 optionally provided on one surface of the substrate film 7, and a release protective layer 11b, a hologram forming layer 16, a reflective thin-film layer 17, and an adhesive layer 18 provided in that order on the other surface of the substrate film 7. When the layers constituting the thermal transfer sheet 21 have an unsatisfactory adhesion, a primer layer (not shown) may be provided between the layers.

In FIG. 5, for the substrate film 7 and the heat-resistant slip layer 13, the materials described above in connection with the thermal transfer sheet, for the formation of an image, as shown in FIG. 3 as such may be used. The description on these materials will be omitted because it has been already given above. However, it should be noted that, for the thickness of the substrate film 7, when a hot stamper (a hot plate) or a hot roll is used as the transfer means, the substrate film is preferably somewhat rigid. For example, when a biaxially stretched polyethylene terephthalate film is used as the substrate film, the thickness thereof is preferably about 12 to 50 µm.

The release protective layer 11b has suitable releasability from the substrate film 7 and, after the transfer, serves to protect the hologram forming layer 16. When a biaxially stretched polyethylene terephthalate film is used as the substrate film 7, the release protective layer 11b may be preferably formed of, for example, a cellulose acetate resin containing a minor amount of a melamine resin with a methylol group introduced thereinto. It may be provided by coating a solution of such a resin and drying the coating. In addition, an acrylic resin, a urethane resin, an acrylic urethane resin, a polyester resin, a vinyl chloride/vinyl acetate copolymer resin, or a mixture of the above resins, which is generally known as a protective layer forming resin, may be suitably used depending upon the substrate film used. It is also possible to use an ionizing radiation-curing resin having excellent plasticizer resistance for forming the release protective layer 11b.

Further, the incorporation of a wax, a lubricant, an antioxidant, or a fluorescent brightening agent as an additive into the above resin can improve the slip property, light fastness, weather resistance, whiteness, and other properties of image faces to be covered.

The hologram forming layer 16 provided on the release protective layer 11b is generally formed of a resin. This layer per se may have either a single layer structure or a multilayer structure.

Further, the hologram forming layer may be of a plane type hologram or a volume type hologram. In the case of a plane type hologram, a relief hologram is particularly preferred from the viewpoint of mass productivity and cost. In addition, laser reproduction holograms, such as a Fresnel hologram, a Fraunhofer hologram, a lensless Fourier transform hologram, and an image hologram, and white light reproduction holograms, such as a rainbow hologram, and holograms utilizing these principles, such as a color hologram, a computer hologram, a hologram display, a multiplex hologram, a holographic stereogram, a holographic diffraction grating and the like may be used.

Hologram forming photosensitive materials usable for recording an interference fringe include silver salts, gelatin dichromate, thermoplastics, diazo photosensitive material photoresists, ferroelectrics, photochromic materials, and chalcogen glass.

Materials for a hologram forming layer include thermoplastic resins, such as polyvinyl chloride, acrylic resins (e.g., polymethyl methacrylate), polystyrene, and polycarbonate, and cured products of thermosetting resins, such as unsaturated polyesters, melamine, epoxy, polyester (meth)acrylate, urethane (meth)acrylate, epoxy (meth)acrylate, polyether (meth)acrylate, polyol (meth)acrylate, melamine (meth)acrylate, and triazine acrylate, and mixtures of thermoplastic resins with thermosetting resins.

Additional materials usable for the hologram forming layer are thermoformable materials having a free-radical polymerizable unsaturated group which are classified into the following two types.

[I] Polymers, having a glass transition point of 0 to 250° C., containing a free-radical polymerizable unsaturated group. More specifically, polymers prepared by introducing a free-radical polymerizable unsaturated group into homopolymers or copolymers of the following compounds (1) to (8) by any one of methods (i) to (iv) described below may be used.

(1) Monomers having a hydroxyl group, for example, N-methylolacrylamide, 2-hydroxyethyl (meth)acrylate, 2-hydroxypropyl (meth)acrylate, 2-hydroxybutyl (meth)acrylate, and 2-hydroxy-3-phenoxypropyl (meth)acrylate.

(2) Monomers having a carboxyl group, for example, acrylic acid, methacrylic acid, and acryloyloxyethyl monosuccinate.

(3) Monomers having an epoxy group, for example, glycidyl methacrylate.

(4) Mohomers having an aziridinyl group, for example, 2-aziridinylethyl methacrylate and allyl 2-aziridinylpropionate.

(5) Monomers having an amino group, for example, acrylamide, methacrylamide, diacetonacrylamide, dimethylaminoethyl methacrylate, and diethylaminoethyl methacrylate.

(6) Monomers having a sulfone group, for example, 2-acrylamido-2-methylpropanesulfonic acid.

(7) Monomers having an isocyanate group, for example, an adduct of a diisocyanate and a free-radical polymerizable monomer having an active hydrogen, such as a 1:1 (molar ratio) adduct of 2,4-toluene diisocyanate and 2-hydroxyethyl acrylate, (8) Further, the above compounds may be copolymerized with the following monomers copolymerizable with the above compounds in order to regulate the glass transition point of the above homo- or copolymers or to regulate properties of cured films. Such copolymerizable monomers include, for example, methyl (meth)acrylate, ethyl (meth)acrylate, propyl (meth)acrylate, butyl (meth)acrylate, isobutyl (meth)acrylate, t-butyl (meth)acrylate, isoamyl (meth)acrylate, cyclohexyl (meth)acrylate, and 2-ethylhexyl (math)acrylate.

The polymer thus prepared is then reacted by any one of the methods (i) to (iv) to introduce a free-radical polymerizable unsaturated group thereinto to prepare a hologram forming resin, (i) In the case of a homo- or copolymer of a monomer having a hydroxyl group, the polymer is condensed with a monomer having a carboxyl group, such as acrylic acid or methacrylic acid.

(ii) In the case of a homo- or copolymer of a monomer having a carboxyl or sulfone group, the polymer is condensed with the above monomer having a hydroxyl group.

(iii) In the case of a homo- or copolymer of a monomer having an epoxy, isocyanate, or aziridinyl group, the polymer is subjected to an addition reaction with the above monomer having a hydroxyl group or the monomer having a carboxyl group.

(iv) In the case of a homo- or copolymer of a monomer having a hydroxyl or carboxyl group, the polymer is subjected to an addition reaction with a monomer having an epoxy group, a monomer having an aziridinyl group, or a 1:1 (molar ratio) adduct of a diisocyanate compound and a hydroxyl-containing acrylic ester monomer.

Preferably, the above reaction is carried out in the presence of a very small amount of a polymerization inhibitor, such as hydroquinone, while introducing dry air.

[2] Compounds, having a melting point of 0 to 250° C., containing a free-radical polymerizable unsaturated group. specifically, stearyl (meth)acrylate, triacryl isocyanurate, cyclohexanediol di(meth)acrylate, spiroglycol di(meth)acrylate and the like may be used.

Further, a mixture of the compounds [1] and [2] may also be used, and it is also possible to add a free-radical polymerizable unsaturated monomer thereto. The free-radical polymerizable unsaturated monomer functions to improve the crosslinking density and the heat resistance upon ionizing radiation irradiation. In addition to the above monomers, ethylene glycol di(meth)acrylate, polyethylene glycol di(meth)acrylate, hexanediol di(meth)acrylate, trimethylolpropane tri(meth)acrylate, trimethylolpropane di(meth)acrylate, pentaerythritol tetra(meth) acrylate, pentaerythritol tri (meth)acrylats, dipentaerythritol hexa(meth)acrylate, ethylene glycol diglycidyl ether di(meth)acrylate, polyethylene glycol diglycidyl ether di(meth)acrylate, propylene glycol diglycidyl ether di(meth)acrylate, polypropylene glycol diglycidyl ether di(meth)acrylate, and sorbitol tetraglycidyl ether tetra(meth)acrylate may be used as the free-radical polymerizable unsaturated monomer. The free-radical polymerizable unsaturated monomer may be used in an amount of 0.1 to 100 parts by weight based on 100 parts by weight on a solid basis of the above copolymer mixture. Curing may be satisfactorily achieved by using an electron beam. In the case of curing by ultraviolet light irradiation, it is also possible to use, as a sensitizer, benzoquinone, benzoin, and a benzoin ether, such as benzoin methyl ether, a halogenated acetophenone, or a biacetyl which can generate a free radical upon being exposed to ultraviolet light.

The hologram forming layer 16 may be formed by the conventional method. For example, when a transparent hologram is a relief hologram, a hologram forming layer 16 having a relief forming face may be formed by providing, as a press mold, an original plate, for a hologram, with an interference fringe recorded in a relief form, placing a hologram forming resin sheet on the original plate for a hologram, heat-pressing the original plate for a hologram against the hologram forming resin sheet by means of a heating roll or the like to replicate the relief pattern, provided on the original plate for a hologram, on the surface of the hologram forming resin sheet, thereby preparing a hologram forming layer 16 having a surface with a relief formed thereon.

An embodiment wherein a reflective thin-film layer 17 is provided on the hologram forming layer 16 is not limited to a relief hologram and applicable also to other holograms. The reflective thin-film layer 17 may be formed of any material which can develop a hologram effect and, at the same time, does not mask the underlying image layer or the like, for example, a transparent material having a refractive index different from the hologram forming layer 16, or a reflective thin-film layer, of a metal, having a thickness of not more than 200 Å.

In the former material, the refractive index may be larger or smaller than that of the hologram forming layer 16. In this case, the difference in refractive index between the reflective thin-film layer and the hologram forming layer is preferably not less than 0.1, more preferably not less than 0.5. The provision of a transparent thin-film layer having a different refractive index can develop a hologram effect and does not mask the underlying image layer. In the case of the latter material, i.e., a reflective thin-film layer of a metal, since the thickness is not more than 200 Å, the transmittance of a light wave is so large that the thin-film layer can develop a hologram effect by virtue of partial reflection and, at the same time, permits transmission of light, i.e., does not mask the underlying image layer.

For example, the following materials (1) to (6) may be used for constituting the reflective thin-film layer 17:

(1) Transparent thin-film layer having a larger refractive index than the hologram forming layer 16:

Transparent thin-film layers of this type are classified into those which are transparent in a visible region and those which are transparent in an infrared or ultraviolet region. Representative examples thereof are as follows. The refractive index (n) of the material is given in parentheses. The same is applied to the materials (2) to (5).

Materials which are transparent in a visible region include $Sb_2S_5$ (3.0), $Fe_2O_3$ (2.7), PbO (2.6), ZnSe (2.6), CdS (2.6), $Bi_2O_3$ (2.4), $TiO_2$ (2.3), $PbCl_2$ (2.3), Zns (2.1), ZnO (2.1), CdO (2.1), SiO (2.0), and TiO (1.9).

Materials which are transparent in an infrared or ultraviolet region include CdSe (3.5), CdTe (2.6), Ge (4.0 to 4.4), PbTe (5.6), Si (3.4), Te (4.9), TlCl (2.9), and ZnTe (2.8).

(2) Transparent ferroelectric substances having a higher refractive index than the hologram forming layer 16:

Specific examples of transparent ferroelectric substances of this type include CuCl (2.0), CuBr (2.2), GaP (3.3 to 3.5), $KH_2AsO_4$ (1.6), $N_4(CH_2)_4$ (1.6), $NH_4H_2PO_4$ (1.5), $LiNbO_3$ (2.3), $BaTiO_3$ (2.4), and $SrTiO_3$ (2.4).

(3) Transparent thin-film layer having a lower refractive index than the hologram forming layer:

Specific examples of materials usable for constituting the transparent thin-film layer include LiF (1.4), MgF (1.4), $3NaF/AlF_3$ (1.4), $AlF_3$ (1.4), $GaF_2$ (1.3), and NaF (1.3).

(4) Reflective thin-film layer, of a metal, having a thickness of not more than 200 Å:

The reflective thin film of a metal has a complex index of refraction, and the complex index of refraction, n*, is represented by n*=n−iK wherein n represents the refractive index and K represents the absorption coefficient.

Specifically, the following materials (n and K being given in parentheses) may be used for constituting the reflective thin-film layer of a metal:

Be (n=2.7, K=0.9), Mg (n=0.6, K=6.1), Ca (n=0.3, K=8.1), Sr (n=0.6, K=3.2), Ra (n=0.9, K=1.7), La (n=1.8, K=1.9), Ce (n=1.7, K=1.4), Cr (n=3.3, K=1.3), Mn (n=2.5, K=1.3), Cu (n=0.7, K=2.4), Ag (n=0.1, K=3.3), Au (n=0.3, K=2.4), Al (n=0.8, K=5.3), Sb (n=3.0, K=5.3), and Ni (n=1.8, K=1.8).

Other materials usable here include Sn, In, Te, Ti, Fe, Co, Zn, Ge, Pb, Cd, Bi, and Se. Further, oxides, nitrides or other compounds of the above listed metals may also be usable. The metals and oxides, nitrides and other compounds of the metals may be used alone or in combination of two or more.

(5) Resins having a refractive index different from the hologram forming layer:

The refractive index of the resins of this type may be larger than or smaller than the that of the hologram forming layer 16. Examples of such resins (the refractive index being given in parentheses) include:

polytetrafluoroethylene (1.35), polychlorotrifluoroethylene (1.43), vinyl acetate resin (1.45 to 1.47), polyethylene (1.50 to 1.54), polypropylene (1.49), methyl methacrylate resin (1.49), nylon (1.53), polystyrene (1.60), polyvinylidene chloride (1.60–1.63), vinyl butyral resin (1.48), vinyl formal resin (1.50), polyvinyl chloride (1.52–1.55), and polyester resin (1.52–1.57).

Besides the above resins, conventional synthetic resins are usable, and resins having a refractive index greatly different from that of the hologram forming layer are preferred.

(6) Laminates comprising suitable combinations of the above materials (1) to (5);

The combination of the materials (1) to (5) may be any one, and the positional relationship between layers in the layer construction may be selected as desired.

Among reflective thin-film layers 17 formed of the above materials (1) to (6), the thickness of the reflective thin-film layer formed of the material (4) is not more than 200 Å. On the other hand, when the reflective thin-film layer is formed of any one of the materials (1) to (3), (5), and (6), the thickness may be such that the transparency is ensured. In this case, however, in general, it is preferably 10 to 10000 Å, more preferably 100 to 5000 Å.

Regarding the formation of the reflective thin-film layer 17 on the hologram forming layer 16, when the reflective thin-film layer 17 is formed of any one of the materials (1) to (4), it may be formed by conventional thin-film forming means, such as vacuum deposition, sputtering, reactive sputtering, ion plating, and electroplating. On the other hand, when the reflective thin-film layer 17 is formed of the material (5), it may be formed by a conventional coating method. When the reactive thin-film layer 17 is formed of the material (6) (laminate), it may be formed by a suitable combination of the above means and method. When the material (5) is used, it should be noted that the layer may not be thin so far as the material is transparent. In this case, according to another embodiment of the invention, a resin layer having a larger thickness than the thickness of the thin film may be provided in the hologram forming layer 16.

Materials for constituting the adhesive layer 18 include a wide variety of conventional adhesives based on an acrylic resin, a vinyl resin, a polyester resin, a urethane resin, a polyamide resin, an epoxy resin, a rubber resin, or an ionomer resin. The thickness of the adhesive layer 18 is in the range of from 0.1 to 50 μm, preferably 1 to 10 μm.

Further, in order to enhance the adhesion between the reflective thin-film layer 17 and the adhesive layer 18, an anchor layer (not shown) formed of a vinyl chloride/vinyl acetate copolymer resin, an acrylic resin, a urethane resin or the like may be provided between the reflective thin-film layer 17 and the adhesive layer 18.

As described above, the formation of a print with a hologram, according to the present invention, using the thermal transfer sheet 21, for a hologram, having the above construction may be performed by providing a transferred image of a sublimable dye ink or a combination of a transferred image of a sublimable dye ink with a transferred image of a hot-melt ink on an image-receiving sheet, providing a protective layer on the transferred image, putting the thermal transfer sheet 21, for a hologram, on the protective layer so as for the surface of the adhesive layer 18 to be brought into contact with the surface of the protective layer, and, in this state, applying heat and pressure to the back surface of the transfer sheet 21 for a hologram by means of a thermal head, a hot stamper (a hot plate), or a hot roll to transfer a hologram layer onto the protective layer.

The hologram layer may be transferred over the whole surface of the print or alternatively on a part of the print. When the hologram layer is provided on a part of the print, the use of a thermal head or a hot stamper is preferred. On the other hand, when the hologram layer is provided over the whole surface of the print, the use of a hot roll system is preferred.

For example, in the case of a hot plate, the thermal transfer sheet 21, for a hologram, and a hologram-receiving object, that is, the protective layer formed on the transferred image in an image-receiving sheet, are put on top of the other so as for the surface of the adhesive layer 18 in the thermal transfer sheet 21 to face the surface of the protective layer, heat and pressure are applied to the back surface of the thermal transfer sheet 21 for a hologram by means of a hot plate, and the substrate film 7 is peeled off to prepare a print with a transparent hologram transferred thereon.

Figure 6:
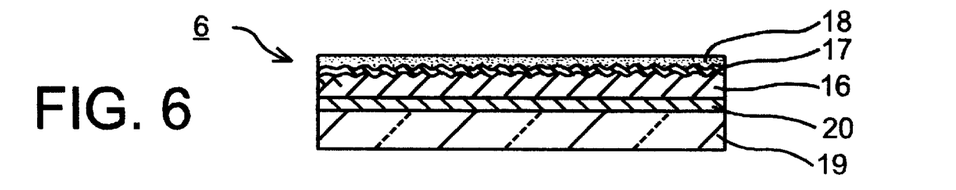
FIG. 6 is a typical cross-sectional view of the construction of one embodiment of a laminate, including a hologram layer, to be laminated onto a protective layer.

FIG. 6 is a typical cross-sectional view showing the construction of one embodiment of a laminate 6, including a hologram layer, which is to be laminated onto the protective layer of the image-receiving sheet, that is, a hot-bondable hologram label (seal).

A laminate 6 including a hologram layer may be generally prepared by providing a transparent film 19 as a substrate, optionally providing a primer layer 20 on one surface of the transparent film 19, and laminating thereon a hologram forming layer 16, a reflective thin-film layer 17, and an adhesive layer 18 in that order.

In FIG. 6, the transparent film 19 may be the same plastic film as described above in connection with the substrate film 7 shown in FIG. 3 so far as the film is transparent. The thickness of the transparent film 19 may be 3.5 to 300 μm.

The primer layer 20 may be optionally provided depending upon the type of the transparent substrate film 19. It may be formed, for example, by coating a properly selected conventional primer resin composed mainly of a urethane resin, a vinyl chloride/vinyl acetate copolymer resin, an acrylic resin or the like. When the transparent film 19 is a biaxially stretched PET film, a good primer layer can be formed by coating a coating liquid comprising a urethane resin with an isocyanate incorporated thereinto.

The hologram forming layer 16, the reflective thin-film layer 17, and the adhesive layer 18 as described above in connection with the thermal transfer sheet 21, for a hologram, shown in FIG. 5 as such may be applied to this embodiment.

The print with a hologram according to the present invention may be prepared, using the laminate 6 including a hologram layer, by providing a transferred image of a sublimable dye ink or a combination of a transferred image of a sublimable dye ink with a transferred image of a hot-melt ink on an image-receiving sheet by means of a thermal head or other means, providing a protective layer on the transferred image, putting the laminate 6 including a hologram layer on the protective layer so as for the surface of the adhesive layer 18 to be brought into contact with the surface of the protective layer, and applying heat and pressure to the laminate 6 by means of a hot plate or a hot roll to heat bond the laminate 6 to the protective layer.

The present invention will be described in more detail with reference to the following examples. In the following examples, "parts" is by weight, and in a continuous thermal transfer sheet (substrate film), the shorter direction of the continuous sheet is referred to as "length," while the longer direction of the continuous sheet is called "width."

EXAMPLE 1

(1) Preparation of Thermal Transfer Sheet for Formation of Image

A 6 μm-thick continuous film of polyethylene terephthalate (hereinafter referred to as "PET film") (Lumirror, manufactured by Toray Industries, Inc.) was provided as a substrate film, and a coating liquid, for a heat-resistant slip layer, having the following composition was coated on one surface of the substrate film by gravure. coating using a full solid plate at a coverage of 1.0 g/m² on a dry basis, and the coating was dried to form a heat-resistant slip layer which was then heated in an oven at 60° C. for 5 days to cure the heat-resistant slip layer.

| Composition of Coating liquid for heat-resistant slip layer | |
|---|---|
| Polyvinyl butyral (S-lec BX-1, manufactured by Sekisui Chemical Co., Ltd.) | 3.6 parts |
| Polyisocyanate (Burnock D750, manufactured by Dainippon Ink and Chemicals, Inc.) | 8.4 parts |
| Phosphate surfactant (Plysurf A208S, manufactured by Dai-Ichi Kogyo Seiyaku Co., Ltd.) | 2.8 parts |
| Talc (Microace P-3, manufactured by Nippon Talc Co., Ltd.) | 0.6 part |
| Toluene/methyl ethyl ketone (weight ratio = 1:1) | 190 parts |

Sublimable dye inks of three colors, i.e., a sublimable yellow dye ink, a sublimable magenta dye ink, and a sublimable cyan dye ink having the following respective compositions were printed on the surface of the substrate film remote from the beat-resistant slip layer were coated by gravure printing to form sets of coatings, each set consisting of three colors of yellow, magenta, and cyan with each color coating having a size of 10 cm in length and 14 cm in width, each at a coverage on a dry basis of 1.3 g/m² in a face serial manner in the longer direction of the substrate film and in a plurality of rows in the shorter direction of the substrate film, thereby forming a sublimable dye ink layer.

In this case, the sets of coatings were provided while leaving a space of 16 cm between each two sets in order to provide a hot-melt ink layer (black).

| Composition of sublimable yellow ink | |
|---|---|
| Dye (FORON BRILLIANT YELLOW S-6GL) | 5.5 parts |
| Polyvinyl acetoacetal (KS-5, manufactured by Sekisui Chemical Co., Ltd.) | 4.5 parts |
| Polyethylene wax | 0.1 part |

| Composition of sublimable yellow ink | |
|---|---|
| Toluene/methyl ethyl ketone (weight ratio = 1:1) | 89.0 parts |

Composition of Sublimable Magenta Ink

The composition of the sublimable magenta ink was the same as that of the sublimable yellow ink, except that only the dye was replaced with a magenta dye (consisting of 1.5 parts of MS RED-G and 2.0 parts of MACROLEX RED VIOLENT R).

Composition of Sublimable Cyan Ink

The composition of the sublimable cyan irk was the same as that of the sublimable yellow ink, except that only the dye was replaced with a cyan dye (Kayaset Blue 714).

Subsequently, in order to provide a hot-melt black ink layer in each space (a size of 10 cm in length and 16 cm in width) provided at intervals of 16 cm between the.above sets of sublimable dye ink layers, a coating liquid, for a release layer, having the following composition was first coated by means of a gravure coater at a coverage on a dry basis of 1.0 g/m², and the coating was dried to form a release layer.

| Composition of coating liquid for release layer | |
|---|---|
| Urethane resin (Hydran AP-40, manufactured by Dainippon Ink and Chemicals, Inc.) | 70 parts |
| Polyvinyl alcohol (Gosenol C-500, manufactured by Nippon Synthetic Chemicall Industry Co., Ltd.) | 30 parts |
| Fluorescent brightening agent (Uvitex C.F., manufactured by Ciba-Geigy) | 0.5 part |
| Water/ethyl alcohol (weight ratio = 2:1) | 300 parts |

Further, in order to provide a release protective layer and a hot-melt ink layer (black) each having the same size as the release layer, a coating liquid, for a release protective layer, having the following composition and an ink, for a hot-melt ink layer, having the following composition were coated on the release layer by gravure coating each at a coverage on a dry basis of 1.0 g/m², and, for each coating, dried to form a hot-melt ink layer region.

| Composition of coating liquid for release protective layer | |
|---|---|
| Acrylic resin (BR-85, manufactured by Mitsubishi Rayon Co., Ltd.) | 88 parts |
| Polyethylene wax | 11.5 parts |
| Polyester | 0.5 part |
| Fluorescent brightening agent (Uvitex O.B. manufactured by Ciba-Geigy) | 0.5 part |
| Toluene/methyl ethyl ketone (weight ratio = 1:1) | 300 parts |

| Composition of ink for hot-melt ink layer | |
|---|---|
| Vinyl chloride/vinly acetate copolymer resin | 60 parts |
| Carbon Black | 40 parts |
| Toluene/methyl ethyl ketone (weight ratio = 1:1) | 200 parts |

(2) Preparation of Thermal Transfer Sheet for Formation of Protective Layer

A 6 μm-thick PET film (Lumirror, manufactured by Toray Industries, Inc.) was provided as a substrate film, and a coating liquid, for a heat-resistant slip layer, having the same composition as described above in connection with the preparation of a thermal transfer sheet for the formation of an image was coated on one surface of the substrate film by gravure coating using a full solid plate at a coverage of 1 g/m² on a dry basis, and the coating was dried and cured in the same manner as described above to provide a heat-resistant slip layer.

A coating liquid, for a release layer, having the same composition as described above in connection with the provision of the hot-melt ink layer was coated by gravure coating on the whole surface of the substrate film remote from the heat-resistant slip layer at a coverage of 1 g/m² on a dry basis, and the coating was dried to provide a release layer. Thereafter, a coating liquid, for a release transparent resin layer, having the following composition was coated by gravure coating on the release layer at a coverage of 1.5 g/m² on a dry basis, and a coating liquid, for an adhesive layer, having the following composition was coated thereon at a coverage of 1 g/m² on a dry basis to provide a release transparent resin layer and an adhesive layer, thereby preparing a transfer film for a protective layer.

| Composition of coating liquid for release transparent resin layer | |
|---|---|
| Acrylic resin (BR-83, manufactured by Mitsubishi Rayon Co., Ltd.) | 95 parts |
| Polyethylene wax | 5 parts |
| Polyester | 0.5 part |
| Toluene/methyl ethyl ketone (weight ratio = 1:1) | 300 parts |

| Composition of coating liquid for adhesive layer | |
|---|---|
| Urethane resin | 20 parts |
| Toluene/methyl ethyl ketone (weight ratio = 1:1) | 80 parts |

(3) Preparation of Thermal Transfer Sheet for Hologram

A 25 μm-thick PET film (Lumirror, manufactured by Toray Industries, Inc.) was provided as a substrate film, and a release protective layer, a hologram forming layer, a reflective thin-film layer (transparent), and an adhesive layer were formed on one surface of the substrate film by the conventional method to prepare a thermal transfer sheet for a hologram.

The reflective thin-film layer was formed in a thickness of 1000 Å by sputtering.

Compositions of coating liquids and materials used for the formation of the above layers were as follows. The hologram forming layer was constructed as a relief hologram after the formation of a resin layer by coating.

| Composition of coating liquid for release protective layer | |
|---|---|
| Cellulose acetate resin | 5 parts |
| Methyl alcohol | 25 parts |
| Methyl ethyl ketone | 45 parts |
| Toluene | 25 parts |
| Melamine resin with methylol group introduced thereinto | 0.5 part |
| p-Toluenesulufonic acid | 0.05 part |

| Composition of coating liquid for hologram forming layer | |
|---|---|
| Acrylic resin | 40 parts |
| Melamine resin | 10 parts |
| Anone | 50 parts |
| Methyl ethyl ketone | 50 parts |

| Composition of coating liquid for adhesive layer | |
|---|---|
| Vinyl chloride/vinyl acetate copolymer resin | 20 parts |
| Acrylic resin | 10 parts |
| Ethyl acetate | 20 parts |
| Toluene | 50 parts |

Material for Reflective Thin-film Layer (transparent)
Zn S (4) Preparation of Print with Hologram A card substrate (dimension of the card; 5.5 cm in length×9 cm in width) comprising 100 parts of polyvinyl chloride (degree of polymerization: 800) compound containing about 10% by weight of an additive, such as a stabilizer, 10 parts of a white pigment (titanium oxide), and 0.5 part of a plasticizer (DOP) was provided as an image-receiving sheet for the formation of an image and the thermal transfer of a hologram using the above thermal transfer sheets.

A full-color photograph-like image, of a face, using sublimable dye inks was formed, using the thermal transfer sheet, for the formation of an image, prepared in the above item (1), by means of a thermal transfer printer on the surface of the card substrate by applying thermal energy with a thermal head connected to electrical signals obtained by color separation of the photograph of a face, and letters and the like for an identification card were printed with the hot-melt black ink.

Subsequently, a protective layer was transferred, using the thermal transfer sheet, for the formation of a protective layer, prepared in the above item (2), onto the full-color photograph-like image of a face by applying thermal energy with the thermal head of the printer.

Thereafter, the thermal transfer sheet, for a hologram, prepared in the above item (3) was put on top of the protective layer on the full-color photograph-like image of a face so that the adhesive layer of the thermal transfer sheet came into contact with the protective layer. A hot plate was placed on the substrate film side of the thermal transfer sheet for a hologram, and heat and pressure were applied to the thermal transfer sheet for a hologram under conditions of 150° C. and 1 Kg/cm$^2$. After cooling, the substrate film was peeled off to transfer a transparent hologram onto the protective layer provided on the surface of the card.

The print with a hologram thus obtained in Example 1 was observed. As a result, the transferred image could be viewed from above the hologram, and a stereoscopic reproduced image of the hologram could be clearly viewed by observing at different angles.

EXAMPLE 2

A print with a hologram of Example 2 was prepared in the same manner as in Example 1, except that, instead of the formation of the hologram layer, on the protective layer on the surface of the card, by thermal transfer, a hot-bondable laminate including a hologram layer was prepared as follows and heated and pressed by means of a hot plate under conditions of 150° C. and 1 kg/cm$^2$ to laminate the laminate onto the protective layer.

For the print with a hologram prepared in this example, as with the print with a hologram prepared in Example 1, the transferred image could be viewed through the laminate including a hologram, and a stereoscopic reproduced image of the hologram could be clearly viewed. (1) Preparation of hot-bondable laminate including hologram layer.

A coating liquid, for a primer layer, having the following composition was coated by gravure coating on one surface of a 25 μm-thick transparent PET film at a coverage of 1 g/m$^2$ on a dry basis, and the coating was then dried to form a primer layer. A hologram forming layer, a reflective thin-film layer, and an adhesive layer were laminated in that order on the primer layer in the same manner as described in Example 1 in connection with the thermal transfer sheet for a hologram to prepare a laminate including a hologram layer.

| Composition of coating liquid for primer layer | |
|---|---|
| Urethane resin | 19 parts |
| Isocyanate | 1 part |
| Toluene/methyl ethylketone (weight ratio = 1:1) | 80 parts |

EXAMPLE 3

A coating liquid, for a dye-receptive layer, having the following composition was coated by gravure coating on one surface of a 125 μm-thick white PET film at a coverage of 3 g/cm$^2$ on a dry basis, and the coating was dried to form a dye-receptive layer. The film bearing a dye-receptive layer was cut into a size of 10 cm in length×14 cm in width to prepare an image-receiving sheet for a card.

| Composition of coating liquid for dye-receptive layer | |
|---|---|
| Vinyl chloride/vinyl acetate copolymer resin | 20 parts |
| Amino-modified silicone | 0.2 part |
| Epoxy-modified silicone | 1 part |
| Toluene/methyl ethyl ketone (weight ratio = 1:1) | 80 parts |

A full-color photograph-like image of a face and a letter image were transferred, using the thermal transfer sheet, for the formation of an image, prepared in Example 1, onto the surface of the dye-receptive layer in the image-receiving sheet by means of a thermal head of a thermal printer in the same manner as in Example 1, and a protective layer was provided thereon.

A coating liquid, for a primer layer, having the following composition was then coated on one surface of a 75 μm-thick transparent PET film at a coverage of 1 g/m² on a dry basis to form a primer layer, and a hologram forming layer, a reflective thin-film layer, and an adhesive layer were laminated in that order on the primer layer in the same manner as in Example 1 to prepare a laminate including a hologram layer.

| Composition of coating liquid for primer layer | |
| --- | --- |
| Urethane resin | 19 parts |
| Isocyanate | 1 part |
| Toluene/methyl ethyl ketone (weight ratio = 1:1) | 80 parts |

The laminate including a hologram layer and the image-receiving sheet bearing a transferred image and a protective layer were put on top of the other so that the surface of the adhesive layer in the laminate faced the surface of the protective layer in the image-receiving sheet, Heat and pressure were then applied under conditions of 150° C. and 1 Kg/cm² to heat-bond the laminate to the image-receiving sheet, and the resultant laminate was cut into a card having a size of 5.5 cm in length×9 cm in width to prepare a print with a hologram of Example 3.

For this print as well, the transferred image could be viewed through a hologram layer, and, in addition, the reproduced image of a hologram could be clearly viewed.

Comparative Example 1

A print with a hologram of Comparative Example 1 was prepared in the same manner as in Example 1, except that the hologram layer was laminated by thermal transfer directly on the transferred image using sublimable dye and hot-melt inks without providing any protective layer on the transferred image.

Comparative Example 2

A print with a hologram of Comparative Example 2 was prepared in the same manner as in Example 3, except that the laminate including a hologram layer was hot-bonded directly onto the transferred image using sublimable dye and hot-melt inks without providing any protective layer on the transferred image.

Prints with a hologram prepared in Examples 1 to 3 and Comparative Examples 1 and 2 were used as samples in the following accelerated test to evaluate the storage stability of the prints.

Test Method

The samples were stored in ovens set respectively at 40° C. and 50° C. for 14 days and, thereafter, compared with untreated samples by visual inspection for a change in the state of the samples, such as bleeding of the transferred image. The results were evaluated according to the following criteria.

○: No change observed
Δ: Slight change observed
x: Significant change observed

The evaluation results are summarized in Table 1.

TABLE 1

(Results of evaluation)

Storage stability of print with hologram

| Sample | Stored at 40° C. for 14 days | Stored at 50° C. for 14 days |
| --- | --- | --- |
| Ex. 1 | ○ | ○ |
| Ex. 2 | ○ | ○ |
| Ex. 3 | ○ | ○ |
| Comp. Ex. 1 | Δ Slight bleeding occurred in dye image | X Bleeding rendered dye image unclear |
| Comp. Ex. 2 | Δ Slight bleeding occurred in dye image | X Bleeding rendered dye image unclear |

As described above in detail, in the print with a hologram and the process for producing the same according to the present invention, a transferred image of a sublimable dye ink or a combination of a transferred image of a sublimable dye ink with a transferred image of a hot-melt ink is provided on an image-receiving sheet, a protective layer is provided on the transferred image, and, thereafter, a hologram layer is thermally transferred from a thermal transfer sheet onto the protective layer, or a laminate including a hologram layer is heated and pressed against the protective layer to heat-bond the laminate to the protective layer, thereby preparing a print with a hologram.

In the above constitution and the production process, since the layer which comes into direct contact with the surface of the transferred image of a sublimable dye ink is not an adhesive layer included in a hologram layer but an adhesive layer included in a protective layer, the adhesive layer can be constituted by a material not containing any substance which is likely to cause bleeding of dyes constituting the sublimation transferred image. Therefore, according to the present invention, it is possible to provide a print with a hologram, wherein the transferred image, even when used or stored for a long period of time, is free from a deterioration in quality of the image derived from bleeding of dyes, can maintain a full-color sharp image having excellent color reproduction and tone reproduction, and has excellent durability and excellent security by virtue of the provision of a hologram, and a process for producing the same.

What is claimed is:

1. A print with a hologram, comprising:
   an image-receiving sheet;
   a transferred image formed on said image-receiving sheet and comprising a sublimable dye ink or a combination of a transferred image of a sublimable dye ink with a transferred image of a hot-melt ink;
   a protective layer containing a filler formed on said transferred image by thermal transfer by means of a thermal head, wherein the portion of said protective layer that contacts said transferred image is free of a plasticizer or a resin having a low glass transition point; and
   a hologram laminated onto the protective layer.

2. The print of claim 1, wherein the hologram comprises a laminate.

3. The print of claim 1, wherein said protective layer comprises a transparent resin layer and an adhesive layer, and said adhesive layer is free of a plasticizer or a resin having a low glass transition point.

4. The print of claim 1, wherein said filler is silica or alumina.

5. The print of claim 1, wherein said protective layer is free of a resin having a low glass transition point.

6. A process for producing a print with a hologram, comprising the steps of:

providing a transferred image including a sublimable dye ink or a combination of a transferred image of a sublimable dye ink with a transferred image of a hot-melt ink on an image-receiving sheet;

providing a protective layer containing a filler on the transferred image by thermal transfer by means of a thermal head, wherein the portion of protective layer that contacts the transferred image is free of a plasticizer or a resin having a low glass transition point; and transferring a hologram from a thermal transfer sheet for the hologram to laminate the hologram onto the protective layer by means of one of a thermal head, a hot stamper, and a hot roll.

7. The process of claim 6, wherein said filler is silica or alumina.

8. The process of claim 6, wherein said protective layer is free of a resin having a low glass transition point.

9. A process for producing a print with a hologram, comprising the steps of:

providing a transferred image comprising a sublimable dye ink or a combination of a transferred image of a sublimable dye ink with a transferred image of a hot-melt ink on an image-receiving sheet;

providing a protective layer containing a filler on the transferred image by thermal transfer by means of a thermal head, wherein the portion of the protective layer that contacts the transferred image is free of a plasticizer or a resin having a low glass transition point; and laminating a laminate including a hologram onto the protective layer by applying heat and pressure using one of a hot plate and a hot roll.

10. The process of claim 9, wherein said filler is silica or alumina.

11. The process of claim 9, wherein said protective layer is free of a resin having a low glass transition point.

* * * * *